United States Patent
Nowak et al.

(10) Patent No.: US 7,095,929 B2
(45) Date of Patent: Aug. 22, 2006

(54) CABLE GELS FOR OPTICAL FIBRE CABLES

(75) Inventors: Rüdiger Nowak, Kahl (DE); Werner Michel, Lützelbach (DE); Pia Hofacker, Bruchköbel (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 10/515,211

(22) PCT Filed: May 15, 2003

(86) PCT No.: PCT/EP03/05089

§ 371 (c)(1), (2), (4) Date: Nov. 18, 2004

(87) PCT Pub. No.: WO03/106602

PCT Pub. Date: Dec. 24, 2003

(65) Prior Publication Data

US 2005/0232556 A1    Oct. 20, 2005

(30) Foreign Application Priority Data

Jun. 14, 2002    (DE) .............................. 102 26 520

(51) Int. Cl.
   *G02B 6/44*    (2006.01)
(52) U.S. Cl. ........................................ 385/100; 385/115
(58) Field of Classification Search ................. 385/100
   See application file for complete search history.

(56) References Cited

U.S. PATENT DOCUMENTS

| | | |
|---|---|---|
| 4,705,571 A | 11/1987 | Lange et al. |
| 4,839,970 A | 6/1989 | Goetze et al. |
| 5,050,959 A | 9/1991 | Randisi |
| 5,276,757 A | 1/1994 | Levy et al. |
| 5,505,773 A * | 4/1996 | Vitands et al. ............... 516/100 |
| 2002/0037936 A1 | 3/2002 | Michael et al. |

FOREIGN PATENT DOCUMENTS

| | | |
|---|---|---|
| DE | 36 22 211 A | 1/1987 |
| DE | 38 39 596 A1 | 5/1990 |
| DE | 199 61 933 A | 7/2001 |

* cited by examiner

*Primary Examiner*—Jennifer Doan
(74) *Attorney, Agent, or Firm*—Smith, Gambrell & Russell, LLP

(57) ABSTRACT

Cable gels contain, in addition to polypropylene glycol and polyol, from 1 to 15 wt. % of a compressed fumed silica which has been rendered hydrophobic with silicone oil.

8 Claims, No Drawings

CABLE GELS FOR OPTICAL FIBRE CABLES

This application is a National Filing to 35 U.S.C 371 based upon International Application No. PCT/EP03/05089, filed May 15, 2003.

INTRODUCTION AND BACKGROUND

The invention relates to cable gels.

It is known to use thixotropic cable gels as filling material in optical fibre cables.

DE 36 22 211 describes a filling material which contains from 50 to 99 wt. % polypropylene glycol, especially having a molar mass from 2000 to 3500, and from 50 to 1 wt. % highly disperse silicon dioxide as thixotropic agent.

U.S. Pat. No. 4,701,016 describes a filling material which contains from 77 to 95 wt. % of an oil or of a mixture of oils and from 2 to 15 wt. % colloidal particles. They may additionally contain up to 15 wt. % of an elastomer. There are used as oils paraffin oil, naphthenic oil, polybutene oil, triglyceride-based vegetable oil, polypropylene oil, chlorinated paraffin oil and polyesters. The colloidal particles consist of hydrophobic fumed silica, precipitated silica and clay.

In U.S. Pat. No. 5,348,669 there is described a filling material which contains from 75 to 95 wt. % of a polypropylene glycol having a molar mass of at least 3000, and from 2 to 20 wt. % of either a hydrophilic or hydrophobic fumed silica. The filling material may additionally contain an antioxidant in order to improve temperature resistance, and an elastomer in order to reduce oil separation.

U.S. Pat. No. 5,433,872 describes a filling material which contains from 75 to 95 parts of a liquid to semi-solid polyol having a molar mass of at least 4000, small amounts of an unsaturated compound, and from 1 to 15 wt. % of a fumed silica as thickener. The filling material may additionally contain a thermoplastic elastomer in order to reduce oil separation.

DE 38 39 596 describes a thixotropic gel and its preparation based on a synthetic hydrocarbon oil and a hydrophobic thixotropic agent. The cable gel is suitable as filling material in the production of optical fibre cables.

It is also known from the series of documents Pigmente No. 63, Degussa AG, 1995, page 28 to 30, that compressing hydrophilic fumed silica enables the silica to be incorporated into the binder more rapidly, for example using a planetary mixer or a planetary dissolver. Incorporation is understood to be the time required until the finely divided silica has disappeared completely from the surface of the binder and is wetted with the binder. Depending on the size of the batch, the dispersing device and the recipe, the incorporation time can be up to several hours and is accordingly the step that determines the speed of production of the product in many applications. Furthermore, because of the increased density of the silica, reduced dust formation of the silica is achieved. The smaller volume of the compressed silica can also be of advantage when planning the system of dispersing devices.

It is a disadvantage that the viscosity of the silica-containing binder falls in most applications as the tamped density increases. Likewise, the dispersibility of the silica deteriorates. A phenomenon which manifests itself in the form of stippling, for example, in the case of a silicone sealing composition and higher surface roughness. Both effects are significant disadvantages. For that reason, compressed hydrophilic fumed silica can be used only in relatively limited fields of application.

Accordingly, the object is to produce cable gels in which those disadvantages do not occur.

SUMMARY OF INVENTION

The invention provides cable gels which are characterised in that they contain, in addition to polypropylene glycol and polyol, from 1 to 15 wt. % of a compressed fumed silica which has been rendered hydrophobic with silicone oil.

The silica used can have a tamped density of from 60 to 150 g/l.

Fumed silicas are known from Ullmann's Enzyklopädie der technischen Chemiei 4th edition, Volume 21, page 464 (1982).

The pyrogenically prepared silica can be rendered hydrophobic by means of silicone oil in a known manner. For example, the following silicas may be used as the pyrogenically prepared silicas which have been rendered hydrophobic with silicone oil:

AEROSIL® R 202 VV 60

AEROSIL® R 202 VV 90.

The physicochemical data of those silicas are listed in Table 1:

TABLE 1

| | | AEROSIL R202 VV60 | AEROSIL R202 VV 90 |
|---|---|---|---|
| Behaviour towards water | | hydrophobic | hydrophobic |
| Appearance | | loose white powder | |
| BET surface area[1] | m$^2$/g | 100 +− 20 | 100 +− 20 |
| Average primary particle size | nm | 14 | 14 |
| Tamped density approx. value[2] | g/l | 60 | 90 |
| Loss on drying[3] | % | <0.5 | <0.5 |
| Ignition loss[4)6] | % | 4–6 | 4–6 |
| C content | % | 3.5–5.0 | 3.5–5.0 |
| pH value[5] | | 4–6[9] | 4–6[9] |
| SiO$_2$[7] | % | >99.8 | >99.8 |
| Al$_2$O$_3$[7] | % | <0.05 | <0.05 |
| Fe$_2$O$_3$[7] | % | <0.01 | <0.01 |
| TiO$_2$[7] | % | <0.03 | <0.03 |
| HCl[7)8] | % | <0.025 | <0.025 |
| Drum size | kg | 10 | 15 |

[1] following DIN 66131
[2] following DIN ISO 787/XI, JIS K 5101/21
[3] following DIN ISO 787/II, ASTM D 280, JIS K 5101/21
[4] following DIN 55921, ASTM D 1208, JIS K 5101/21
[5] following DIN ISO 787/IX, ASTM D 1208, JIS K 5101/24
[6] based on material dried for 2 hours at 105° C.
[7] based on material ignited for 2 hours at 1000° C.
[8] HCl content is a constituent of the ignition loss
[9] in water:ethanol = 1:1

In a preferred embodiment of the invention, a silica known from document DE 199 61 933 A1 can be used.

Using that silica it is possible according to the invention markedly to shorten the time required for the production of the cable gel compared with an uncompressed fumed silica rendered hydrophobic with a silicone oil, while the rheological and application-related properties of the thixotropic cable gel remain equally as good. This saving in terms of time when producing the cable gel enables the costs to be reduced. A further advantage achieved with that more highly compressed fumed silica is reduced dust formation during incorporation into the binder.

DETAILED DESCRIPTION OF INVENTION

It is surprising according to the invention that the compressed fumed silica which has been rendered hydrophobic with a silicone oil is markedly different from the compressed hydrophilic fumed silica as regards Theological and application-related parameters. There is thus no appreciable fall in the viscosity of a cable gel as the degree of compression of the hydrophobic silica increases. Nor is there any deterioration in other application-related parameters of the cable gel, such as, for example, oil separation. Incorporation of the compressed hydrophobic silica into the polypropylene glycol of the cable gel is markedly shorter than in the case of an uncompressed hydrophobic silica. Accordingly, the cable gel can be produced in a shorter time. This means an improvement to the prior art. Further advantages which are obtained with the use of a compressed hydrophobic silica are, as in the case of compressed hydrophilic silicas, reduced dust formation during incorporation into the binder.

The cable gels according to the invention can be used in the production of glass fibre cables.

EXAMPLES

Irganox L 57 and Irganox L 135 are used as antioxidants.
Irganox L 57 is:

| CAS Number | Product name | Content | Symbols | R sets |
|---|---|---|---|---|
| 068411-46-1 | Aniline, N-phenyl-, reaction products with 2,4,4-trimethylpentene | >99% | N | R 51/53 |
| 000122-39-4 | Diphenylamine | <1% | N-T | R 23/24/25 - R 33 - R 50/53 |

Irganox L 135 is a high molecular weight liquid antioxidant of the formula

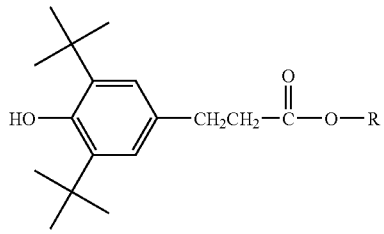

Example 1

Production of cable gels using a dissolver and AEROSIL® R 202 and AEROSIL® R 202 VV 90

Recipe:

| 89.3 wt. % | polypropylene glycol having a molar mass of 3850 g/mol. |
|---|---|
| 1.4 wt. % | Irganox L57 (2 parts) and Irganox L135 (1 part) in the form of a mixture |
| 9.3 wt. % | AEROSIL® R 202 or AEROSIL® R 202 VV 90 |

Procedure:

The polypropylene glycol is placed into the container of the dissolver. The antioxidant Irganox is added with gentle stirring. The silica is added in portions with gentle stirring, and the incorporation time is measured until the silica has disappeared completely from the surface of the polypropylene glycol and is completely wetted with the polypropylene glycol. Dispersion is then carried out in vacuo for 10 minutes at 3000 rpm.

After 1 day's storage at room temperature, the viscosity of the cable gel is measured using a cone/plate rheometer at 23° C. and 20/s.

Likewise after storage of the cable gel for 1 day, the oil separation of the cable gel is measured by the following wire cone method: The cable gel is introduced by means of a spatula, as far as possible without bubbles, into a nickel wire cone (60 mesh sieve) and suspended over a glass beaker by a wire. The glass beaker is placed in an oven at 80° C. for 24 hours. The oil separation of the cable gel, i.e. the pure oil that has dripped onto the bottom of the glass beaker during storage at high temperature, is determined gravimetrically by re-weighing and is indicated in percent.

Results:

| Description | Incorporation time in s | Viscosity in Pa s | Oil separation in % |
|---|---|---|---|
| Cable gel with AEROSIL® R 202 | 81 | 23.9 | 0.65 |
| Cable gel with AEROSIL® R 202 VV 90 | 36 | 23.3 | 0.77 |

Evaluation:

The incorporation time when AEROSIL® R 202 VV 90 is used is markedly shorter than when AEROSIL® R 202 is used, with almost identical viscosities and identical oil separations. Production of the cable gel can therefore be shortened by using AEROSIL® R 202 VV 90.

Example 2

Production of cable gels by means of a 3-roller mill using AEROSIL® R 202, AEROSIL® R 202 w 90 and AEROSIL® 200

Recipe:

| 89.1 wt. % | polypropylene glycol having a molar mass of 2700 g/mol. |
|---|---|
| 1.4 wt. % | Irganox L57 (2 parts) and Irganox L135 (1 part) in the form of a mixture |
| 9.5 wt. % | AEROSIL® R 202 or AEROSIL® R 202 VV 90 or AEROSIL® 200 |

Procedure:

The polypropylene glycol is placed into the container of the dissolver. The antioxidant Irganox is added with gentle stirring. The silica is added in portions with gentle stirring, and the incorporation time is measured until the silica has disappeared completely from the surface of the polypropylene glycol and is completely wetted with the polypropylene glycol. The cable gel is then milled twice in each case by means of a 3-roller mill.

After 1 day's storage at room temperature, the viscosity and the flow limit are measured using a cone/plate rheometer at 23° C. and 20/s. Likewise after storage of the cable gel for 1 day, the oil separation of the cable gel is measured by the following wire cone method: The cable gel is introduced by means of a spatula, as far as possible without bubbles, into a nickel wire cone (60 mesh sieve) and suspended over a glass beaker by a wire. The glass beaker is placed in an oven at 80° C. for 24 hours. The oil separation of the cable gel, i.e. the pure oil that has dripped onto the bottom of the glass beaker during storage at high temperature, is determined gravimetrically by re-weighing and is indicated in percent.

Results:

| Description | Incorporation time in s | Flow limit in Pa | Viscosity in Pa s | Oil separation in % |
|---|---|---|---|---|
| Cable gel with AEROSIL ® R 202 | 16 | 154 | 22.7 | 2.0 |
| Cable gel with AEROSIL ® R 202 VV 90 | 8 | 122 | 20.0 | 2.1 |
| Cable gel with AEROSIL ® 200 | 28 | 0.01 | 35 | 97 |

Evaluation:

AEROSIL® R 202 VV 90 can be incorporated into the polypropylene glycol markedly more rapidly than AEROSIL® R 202, with approximately comparable Theological properties and oil separations.

The hydrophilic fumed silica AEROSIL® 200 is not suitable for the production of a polypropylene glycol-based cable gel, because the oil separation of 97% in that case is much too high.

The invention claimed is:

1. Cable gels, characterized in that they contain, in addition to polypropylene glycol and polyol, from 1 to 15 wt. % of a compressed fumed silica which has been rendered hydrophobic with silicone oil.

2. The cable gel composition according to claim 1 wherein said silica has a tamped density of from 60 to 150 g/l.

3. The cable gel composition according to claim 2 wherein the tamped density of the silica is 90 g/l.

4. The cable gel composition according to claim 1 further comprising an antioxidant.

5. The cable gel composition according to claim 4 wherein the antioxidant is a mixture of an N-phenyl aniline reaction product with 2,4,4-trimethylpentene and diphenylamine.

6. A glass fiber cable containing the cable gel composition of claim 1 as a filling compound.

7. A cable gel composition comprising at least one of a polypropylene glycol and a polyol and from 1 to 15 wt. % of a compressed fumed silica which has been rendered hydrophobic with silicone oil.

8. A glass fiber cable containing the cable gel composition of claim 7 as a filling compound.

* * * * *